(12) United States Patent
Kozar et al.

(10) Patent No.: US 9,950,613 B2
(45) Date of Patent: Apr. 24, 2018

(54) USE OF FLAPS IN FUEL BLADDERS TO SEAL PUNCTURES

(71) Applicant: The Boeing Company, Chicago, IL (US)

(72) Inventors: Michael P. Kozar, Mercer Island, WA (US); Mark S. Wilenski, Mercer Island, WA (US); Amy E. Bahe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 14/843,582

(22) Filed: Sep. 2, 2015

(65) Prior Publication Data

US 2017/0057343 A1    Mar. 2, 2017

(51) Int. Cl.
*B64D 37/32* (2006.01)
*B60K 15/03* (2006.01)

(52) U.S. Cl.
CPC ........... *B60K 15/03177* (2013.01); *B60K 2015/03309* (2013.01); *B60K 2015/03407* (2013.01); *B60K 2015/03447* (2013.01)

(58) Field of Classification Search
CPC .... B60K 15/03177; B60K 2015/03309; B60K 2015/03407; B60K 2015/03447
USPC ........ 220/4.14, 900, 560.02, 560.03, 560.01; 428/912; 244/135 R
See application file for complete search history.

(56) References Cited

U.S. PATENT DOCUMENTS

| | | | |
|---|---|---|---|
| 1,386,791 A | 8/1921 | Murdock | |
| 1,406,667 A | 2/1922 | Macbeth | |
| 1,463,498 A | 7/1923 | Burgess | |
| 2,395,556 A | 2/1946 | Kopplin | |
| 2,406,679 A | 8/1946 | Gray et al. | |
| 2,416,231 A | 2/1947 | Smith et al. | |
| 2,421,613 A | 6/1947 | DeWeese | |
| 2,422,797 A | 6/1947 | Pfleumer | |
| 2,425,514 A | 8/1947 | Dasher et al. | |
| 2,439,562 A | 4/1948 | Cunningham | |
| 2,438,965 A | 6/1948 | Dasher | |
| 2,446,815 A | 8/1948 | Davies | |
| 2,451,911 A | 10/1948 | Braden | |
| 2,626,882 A | 1/1953 | Gerke | |
| 2,715,085 A | 8/1955 | Boger | |
| 3,379,336 A * | 4/1968 | Stedfeld ................ B65D 90/02 220/560.02 |
| 3,431,818 A | 3/1969 | King | |
| 3,509,016 A * | 4/1970 | Wickersham, Jr. ..... B32B 27/00 220/560.02 |
| 3,563,846 A | 2/1971 | Harr | |
| 3,654,057 A | 4/1972 | Olevitch | |
| 3,664,904 A | 5/1972 | Cook | |

(Continued)

*Primary Examiner* — J. Gregory Pickett
*Assistant Examiner* — Elizabeth Volz
(74) *Attorney, Agent, or Firm* — McDonnell Boehnen Hulbert & Berghoff LLP

(57) ABSTRACT

A self-sealing bladder including a liquid impermeable material layer that is compatible with a liquid held in the bladder and a plurality of flexible sealing flaps extending inwardly from the interior surface of the liquid bladder wherein, in response to a hole formed in the bladder that establishes an unwanted flow of liquid from the bladder, at least one sealing flap responds to the unwanted flow of fluid by bending towards and at least partially covering the hole.

21 Claims, 4 Drawing Sheets

(56) References Cited

U.S. PATENT DOCUMENTS

| | | | |
|---|---|---|---|
| 3,698,587 A | 10/1972 | Baker et al. | |
| 3,801,425 A | 4/1974 | Cook | |
| 3,949,894 A | 4/1976 | Underwood | |
| 3,980,106 A | 9/1976 | Wiggins | |
| 4,088,240 A * | 5/1978 | San Miguel | B60K 15/03177 220/560.02 |
| 4,115,616 A | 9/1978 | Heitz et al. | |
| 4,216,803 A | 8/1980 | Hall | |
| 4,336,291 A | 6/1982 | Broadhurst et al. | |
| 4,422,561 A * | 12/1983 | Grosvenor | B64D 37/06 220/4.14 |
| 4,925,057 A | 5/1990 | Childress et al. | |
| 5,383,567 A | 1/1995 | Sorathia et al. | |
| 7,381,287 B2 | 6/2008 | Monk et al. | |
| 7,393,572 B1 | 7/2008 | Monk et al. | |
| 7,794,808 B2 | 9/2010 | Dudt et al. | |
| 7,861,844 B2 | 1/2011 | Hayduchok et al. | |
| 7,900,333 B2 | 3/2011 | Tweet et al. | |
| 8,043,676 B2 | 10/2011 | Ohnstad et al. | |
| 8,505,761 B2 | 8/2013 | Tweet et al. | |
| 8,685,513 B1 | 4/2014 | Dry | |
| 8,777,158 B2 | 7/2014 | Erickson | |
| 8,985,380 B2 | 3/2015 | Cook | |
| 2004/0065456 A1 | 4/2004 | Belli et al. | |
| 2007/0009694 A1 | 1/2007 | Monk et al. | |
| 2008/0264951 A1 | 10/2008 | Tweet et al. | |
| 2010/0187236 A1 | 7/2010 | LeRossignot et al. | |
| 2011/0186580 A1 * | 8/2011 | Joh | B63B 25/16 220/560.06 |
| 2011/0253726 A1 | 10/2011 | Monk et al. | |
| 2012/0055937 A1 | 3/2012 | Monk et al. | |
| 2012/0058348 A1 | 3/2012 | Monk et al. | |
| 2012/0058700 A1 | 3/2012 | Ohnstad et al. | |
| 2012/0181207 A1 | 7/2012 | Cook | |
| 2013/0140046 A1 | 6/2013 | Monk et al. | |
| 2013/0256315 A1 | 10/2013 | Bongiovanni | |
| 2015/0151630 A1 | 6/2015 | Bethea | |
| 2015/0291332 A1 | 10/2015 | Misciagna | |
| 2016/0347038 A1 | 12/2016 | Childress et al. | |
| 2017/0057341 A1 | 3/2017 | Wilenski et al. | |
| 2017/0057342 A1 | 3/2017 | Kozar et al. | |
| 2017/0057344 A1 | 3/2017 | Kozar et al. | |
| 2017/0057345 A1 | 3/2017 | Wilenski et al. | |
| 2017/0144818 A1 | 5/2017 | Wilenski et al. | |

* cited by examiner

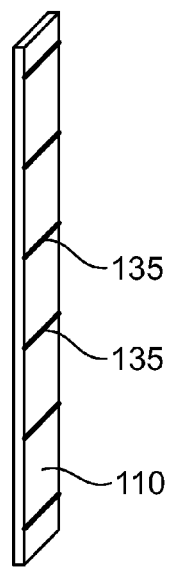
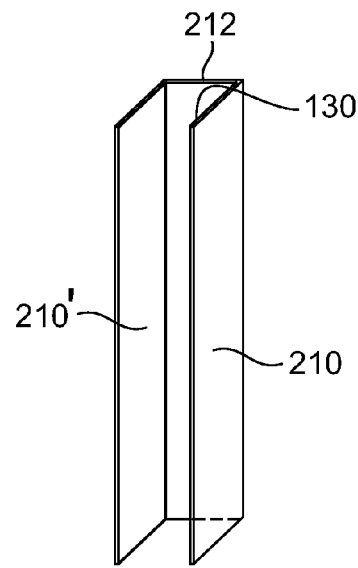
FIG. 7                    FIG. 8
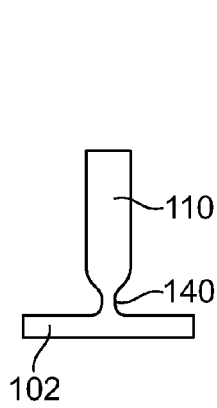
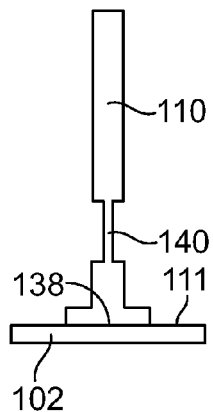
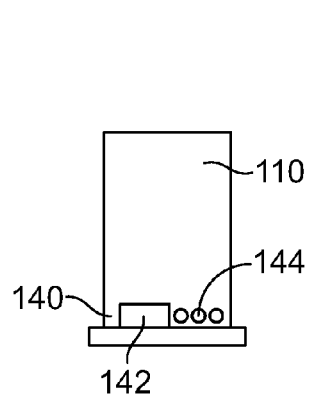
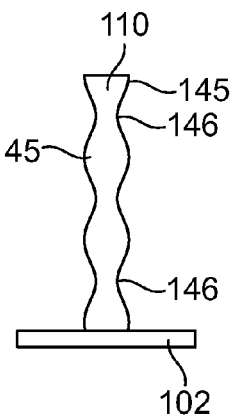
FIG. 9A     FIG. 9B     FIG. 9C     FIG. 9D

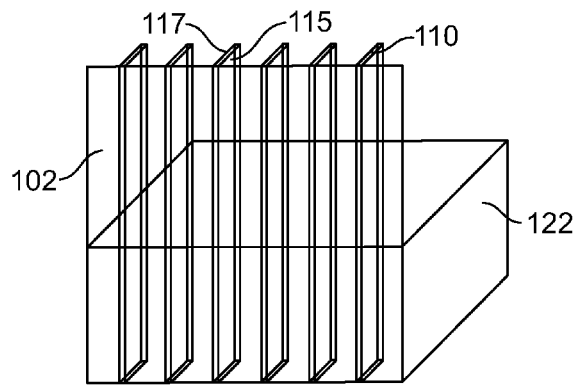
FIG. 10A
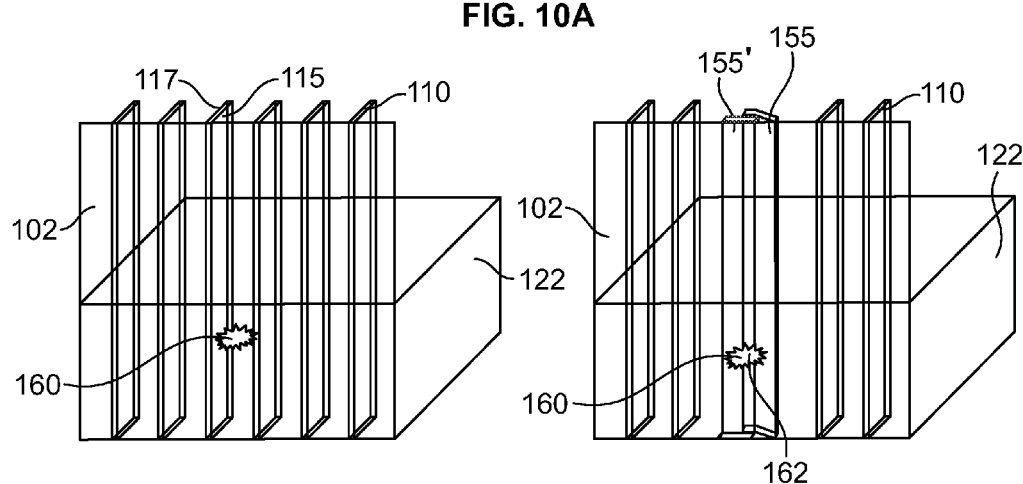
FIG. 10B     FIG. 10C
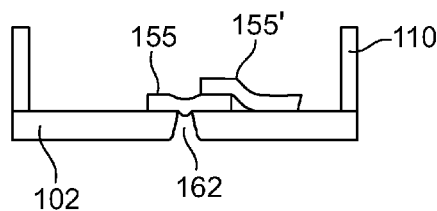     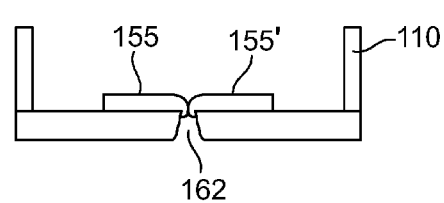
FIG. 11A     FIG. 11B

USE OF FLAPS IN FUEL BLADDERS TO SEAL PUNCTURES

BACKGROUND OF THE INVENTION (1) Field of the Invention

This invention relates to self-sealing liquid containing bladders that include internal flaps which may have various sizes and geometries that act to seal wounds or holes in the bladder wall.

(2) Description of the Art

Containers are routinely used to hold hazardous and non-hazardous liquids such as hydrocarbons (fuels such as gasoline and kerosene, LPG, crude oil, petrochemicals and the like), liquid hazardous wastes, aqueous acidic and caustic materials, industrial feedstocks, foodstuffs such as milk and oils, and a wide variety of additional liquid materials. Such containers often include bladders to contain the liquid and to prevent the liquid from contacting the container walls which might be liquid permeable or which might react with the liquid held in the container. The liquid bladders also ensure that leaks are prevented in the event the outer container is breached by a perforation, by corrosion or by any other mechanism.

Liquid holding containers that include bladders can be perforated to form a hole or wound through which the liquid in the bladder is able to leak out. Some containers employ features to minimize liquid leakage in the event a container is damaged. Minimizing liquid leakage can be especially important with fuel holding containers such as fuel tanks where holes or wounds can allow fuel leakage that can swiftly reduce the amount of fuel available to power the vehicle. Such fuel leaks can result in a financial loss of valuable fuel, in environmental contamination, in a risk of fire, or in a total vehicle loss.

Military vehicles (e.g., military aircraft, tanks, trucks and the like) are especially vulnerable to fuel tank damage such as damage during combat as a result of being hit by ballistics, small arms fire, projectile weapons and/or other similar devices. Such damage can include holes, wounds, punctures, tears, piercings, perforations etc. in the vehicle, with those affecting the fuel tank being particularly problematic. Accordingly, many vehicles, military or otherwise, utilize self-sealing fuel tanks to minimize such risks when the fuel tank is perforated. Conventional self-sealing fuel tanks use a thick layer of natural rubber in the center of a bladder wall. When the tank and self-sealing bladder are punctured, fuel from the tank interacts with the natural rubber of the bladder and causes the rubber to swell to an extent that the hole is effectively sealed, thereby inhibiting further fuel leakage. However, the natural rubber can take a significant amount of time (e.g., 2 minutes or more) to swell sufficiently to seal the puncture. In addition, larger caliber penetrations are not easily sealed by natural rubber sealants. Furthermore, conventional self-sealing fuel tank bladders can be stiff, heavy, and difficult and expensive to install. Therefore, there is need for improved self-sealing liquid containing bladders.

SUMMARY OF THE INVENTION

The presently disclosed self-sealing bladders may be used as is or they may be used in conjunction with a fluid holding container in order to reduce and/or essentially stop fluid leaks caused by damage (e.g., a perforation) to the bladder/container. For example, the self-sealing bladders may be placed within a fuel tank to automatically reduce the size of and/or essentially seal fuel tank holes or wounds. The seal-sealing effect may be rapid in some examples, may be capable of sealing larger caliber penetrations than are conventional self-sealing bladders, may be lighter and easier to install than conventional self-sealing bladders, and/or may be more flexible than conventional self-sealing bladders.

In one aspect, this disclosure includes a self-sealing bladder comprising a liquid bladder defining a volume capable of holding a fluid and having a liquid impermeable material layer that is compatible with a liquid held in the bladder, the bladder impermeable material layer having an interior surface and an exterior surface; and a plurality of sealing flaps extending inwardly from the liquid bladder interior surface wherein, in response to a hole formed in the bladder wall that establishes an unwanted flow of liquid out of the bladder, at least one sealing flap responds to the unwanted liquid flow by bending towards the hole and at least partially reducing the rate at which the unwanted liquid flows out of the bladder.

In another aspect, this disclosure includes a self-sealing bladder including a liquid bladder defining a volume capable of holding a hydrocarbon fuel and having a liquid impermeable material layer that is compatible with the hydrocarbon fuel, the liquid impermeable material layer having an interior surface and an exterior surface; and a plurality of rows of substantially parallel sealing flaps extending inwardly from the bladder interior surface, each flap having a width of from about 1 inch to about 10 inches wherein, in response to a hole formed in the bladder liquid impermeable material layer that establishes an unwanted flow of hydrocarbon fuel from the bladder, at least one flexible sealing flap responds to the unwanted flow of hydrocarbon fuel by moving towards and substantially covering the hole wherein the hole has a diameter of from greater than 0 to about 3 inches.

BRIEF DESCRIPTION OF THE DRAWINGS

FIG. 7 is a schematic representation of a reinforced sealing flap;

FIG. 8 is a schematic representation of an optional sealing flap design;

FIG. 9A, FIG. 9B, FIG. 9C and FIG. 9D are schematic representations of sealing flap hinges;

FIG. 10A, FIG. 10B and FIG. 10C are schematic representations of a method for sealing a bladder hole with sealing flaps; and FIG. 11A and FIG. 11B are schematic representations of sealing flap orientations that result in sealing flaps overlapping and moving adjacent to one another to seal a bladder hole.

DESCRIPTION OF CURRENT EMBODIMENTS

Self-sealing bladders and related methods are disclosed herein. The self-sealing bladders may be used to reduce loss of a fluid from a container when the container is perforated by a hole or a wound. Presently disclosed self-sealing bladders may provide faster plugging/sealing of wounds or holes in bladder walls caused by penetrating objects in comparison to prior art self-sealing tanks, may be able to seal larger wounds than prior art self-sealing tanks, may be easier to install than prior art devices, may be more flexible than prior art devices, may be lighter than prior art devices, may have a thinner bladder wall than prior art devices, and/or may enable the cavity or container in which the self-sealing bladder is placed to hold more fuel than prior art devices.

Self-sealing bladders that are described herein have a multitude of possible uses. The self-sealing bladders may be used in bladder holding containers of any sort including but not limited to bladders that are used to store, transport, provide etc. . . . hazardous and non-hazardous liquids such as; hydrocarbons, including but not limited to fuels such as gasoline and kerosene, LPG, crude oil, petrochemicals and the like; liquid hazardous wastes; aqueous acidic and caustic liquids, industrial feedstocks; water; foodstuffs such as milk and oils, and a wide variety of additional liquid materials.

Self-sealing bladders may be used in conjunction with containers including, but not limited drums, barrels, storage tanks, fuel tanks, tanker trucks, railroad tank cars, liquid storage and liquid feed vessels and any similar containers. Self-sealing bladders may be particularly useful in conjunction with containers in the form of fuel tanks and in particular aircraft fuel tanks and/or military vehicle fuel tanks because these types of fuel tanks are prone to perforation by military ordinance and/or because fuel loss from these types of fuel containers can have catastrophic consequences. However, the self-sealing bladders can be equally useful in conjunction with conventional fuel tanks such as those found in watercraft, land vehicles, spacecraft, automobiles, motorcycles, trucks, construction equipment, buses, and other like fuel propelled vehicles.

Self-sealing bladders can be used in association with containers and tanks having a wide range of volumes. For example, the bladders can have a liquid volume of as little as 1 L or as great as 100,000 L or even much larger. For very large tanks and containers, multiple bladders can be placed in a container and interconnected with conduits to provide the necessary fluid volume.

Figure 1:
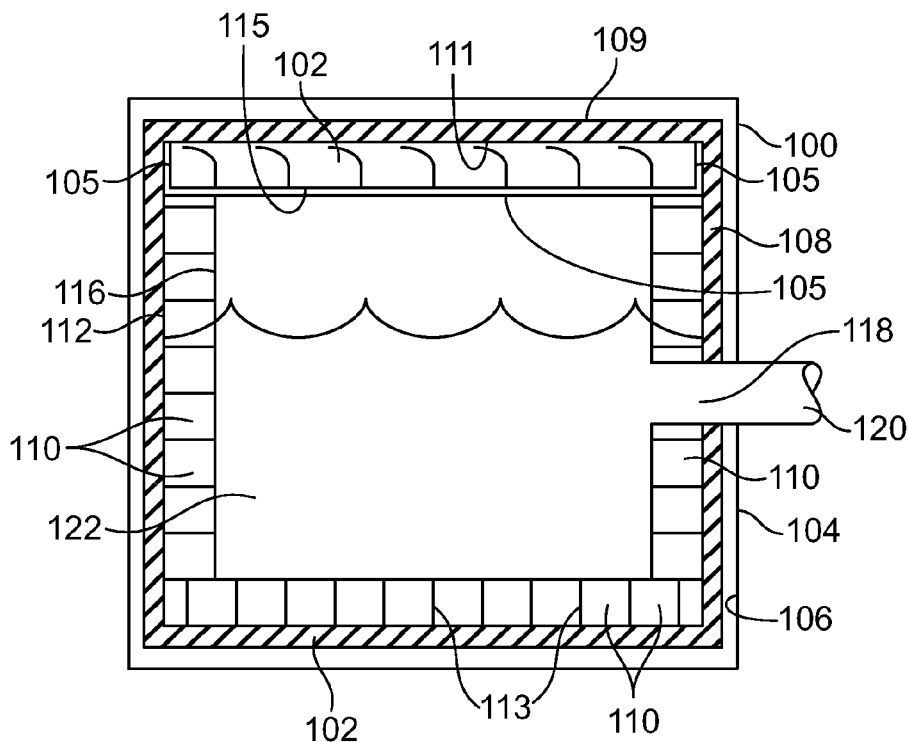
FIG. 1 is a schematic representation of a container for holding a fluid that includes a self-sealing bladder according to the present disclosure.

Turning now to FIG. 1 there is shown a schematic of a container (100) including a self-sealing bladder (102). Container (100) includes a wall having an exterior surface (104) and an opposing interior surface (106). Self-sealing bladder (102) includes a liquid impermeable layer (108) that is compatible with (inert to) the liquid held in the bladder. Impermeable layer (108) has an outer surface (109) and an inner surface (111). Self-sealing bladder (102) further includes a plurality of flaps (110) that are associated with inner surface (111). The flaps (110) shown in FIG. 1 include gaps (113) that separate adjacent flaps. Flaps (110) can be associated with inner surface (111) in one manner by attaching a flap edge (112) to bladder inner surface (111). Alternatively, flaps (110) can include a common rib (107) from which the flap(s) hang and that is attached to a bladder inner surface (111) at flap ends (105). In this alternative, the flaps are oriented such that at least a portion of flaps (110) can lie on bladder inner surface (111).

Container (100) defines a volume (116) which is occupied by the fluid filled self-sealing bladder (102). Container (100) will typically include one or more openings (118) through which a conduit (120) associated with self-sealing bladder (102) can pass. The conduit (120) may be used to direct liquid (122) into or out of self-sealing bladder (102). Multiple conduits can be associated with self-sealing bladder (102) where, for example, one conduit can be used to direct liquid (122) into self-sealing bladder (102) and another separate conduit can be used to withdraw liquid (122) from self-sealing bladder (102).

Figure 2:
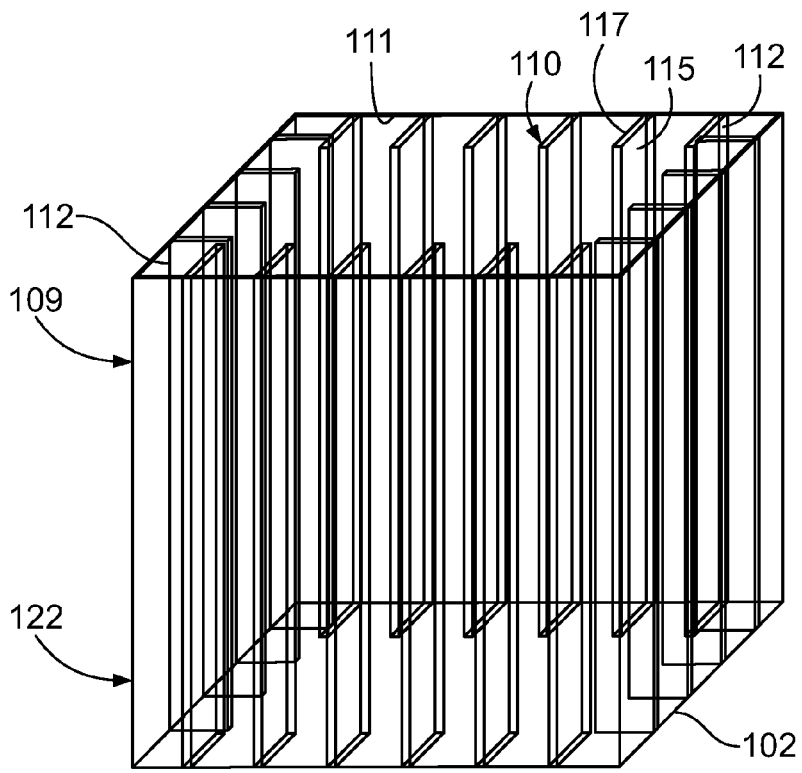
FIG. 2 is a perspective view of a self-sealing bladder including a plurality of parallel spaced apart sealing flaps.

FIG. 2 is a schematic representation of a self-sealing bladder (102) including a plurality of parallel flaps (110) and including an edge (112) that is attached to our otherwise associated with bladder inner surface (111) to hold flaps (110) in place. Each of the plurality of flaps has a first surface (115) and a second surface (117). Flaps (110) can bend or fold towards bladder inner surface (111) to allow one of the first surface (115) or second surface (117) to contact bladder inner surface. These flap surfaces may be planar, may match the local shape of the bladder wall, may be thin enough to easily conform to the local bladder wall shape, or may have another shape.

The plurality of flaps (110) may be arranged on inner surface (111) in any orientation that provides a bladder with substantial sealing protection. The term "substantial sealing protection" refers to an arrangement of flaps (110) that is capable of covering at least 50% of the bladder inner surface, more preferably at least 90% of the bladder inner surface and even more preferably at least 99% of the bladder inner surface. Alternatively the flaps (110) will be arranged to at least partially seal a bladder hole or wound. The term "partially seal" means that the flaps can be arranged to reduce unwanted fluid flow through a bladder hole or wound by at least 50% by volume. In another aspect, the flaps are arranged to "substantially seal" the hole or wound in which case they will reduce the amount of fluid flowing from a bladder hole or wound by at least 90% by volume.

Figure 3:
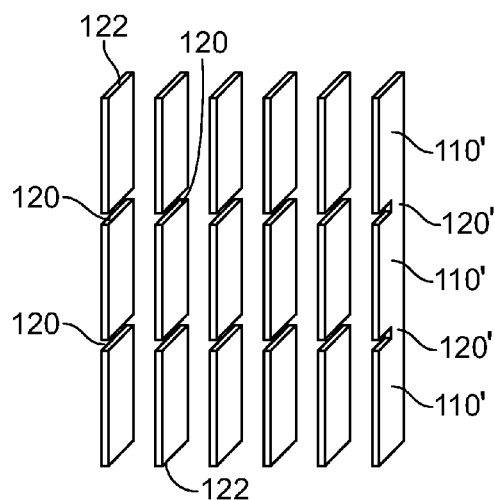
FIG. 3, FIG. 4, FIG. 5 and FIG. 6 are schematic representations of sealing flap designs and orientations.

FIGS. 3-8 are schematic representations of various sealing flap orientations and designs. In FIG. 3, flaps (110) are segmented in which case a gap (120) divides each flap segment (110') in a flap row (122). Gap (120) may extend lengthwise partially or fully to bladder inner surface (111). In FIG. 3, several of the gaps are partial gaps (120').

Figure 4:
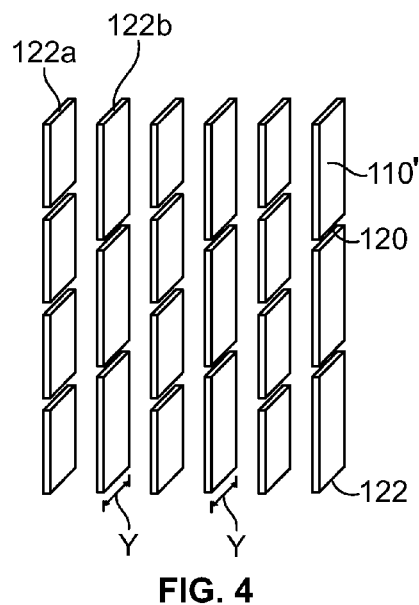
Figure 5:
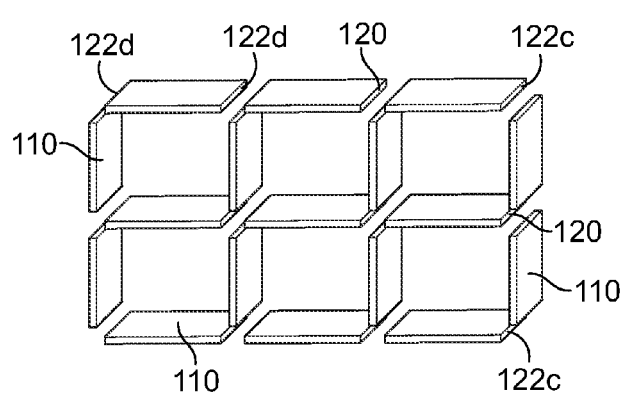

The flaps in FIG. 4 are also segmented flaps (110') that include gaps (120) dividing adjacent flap segments. The flap segments (110') are arranged lengthwise in parallel rows. In FIG. 4, the flap segments (110') in adjacent parallel rows (122a, 122b) are offset from one another such that the flap gaps (120) do not line up with each other. The flaps in FIG. 5 are oriented in a checkerboard pattern with intersecting rows (122c) and columns (122d) of parallel segmented flaps.

Figure 6:
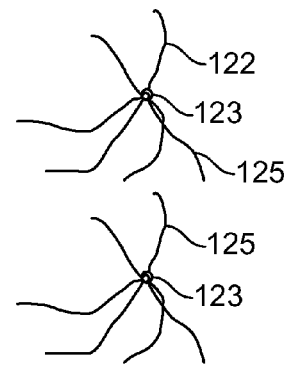

In FIG. 6, flaps (110) are fibrous structures having a plurality of tendrils (125) where the plurality of tendrils may or may not meet at a common root (123) to form a bundle. Each tendril (125) may have a length that is substantially greater than its width. For example, a tendril can be ribbon shaped, rope shaped, or they may take on any other shape that allows one or more tendrils to at least partially seal unwanted bladder holes. Tendrils (125) can be attached to bladder inner surface (111) or to an inner wall portion in amounts and in orientations that provide the bladder inner surface (111) with substantial sealing protection. For example, individual tendrils can be attached to bladder inner surface such that adjacent tendrils are separated by no more than about a distance equal to the average width of the tendrils.

A flap including intermittent reinforcements is shown in FIG. 7 where flap (110) includes a plurality of stiffening ribs (135) where each of the plurality of stiffening ribs (135) are spaced apart from one another. Stiffening ribs (135) may be, for example, wires, a thickened flap portion, thin strips of hard plastic or metal and any other material that is stiffer than the sealing flap to which it is associated.

In FIG. 8, parallel flaps (210 and 210') are attached to a base (130). The spacing between flaps (210 and 210') is set by the width of base (130). A rear surface (212) of base (130) can be attached to bladder inner surface (111).

Flaps (110) may be may be made from any material that allows the flaps to move and bend in response to fluid flowing out of a bladder hole. However, while it may be useful, it is not required that the flaps are flexible. The flaps can be made of stiff or inflexible materials. In either case, the one or more flaps can include hinges that facilitate the movement of flaps towards a bladder hole or wound. Examples of useful flap materials can include but is not limited to rubber, polyisoprene, fluoroelastomers, polyethylene naphthalate (PEN), polyoxymethylene (POM), Mylar sheets, polypropylene sheets, and other polymeric sheet materials. The chosen flap material(s) and the bladder inside wall material should be inert to the liquid held in the bladder.

The flaps can further include structural or integral reinforcement(s). Flaps including integral reinforcement(s) can include flaps made of composite materials such the combination of the rubber or polymeric materials mentioned above with integral woven or nonwoven fibers. The integral reinforcements may be continuous or intermittent reinforcements. A continuous integral reinforcement would include, for example, flaps made essentially entirely of a composite material.

Sealing flaps (110) may also include one or more structural reinforcements. Structural reinforcements are reinforcements that stiffen a sealing flap that are integral to the flap or that result from the manner in which a sealing flap is associated with bladder inner surface (111). A structural reinforcement can include flap corrugation, a portion of a flap that is thicker than the average flap thickness and flaps having non-planar surfaces.

Sealing flaps (110) are useful for partially sealing or substantially sealing bladder holes or wounds. When a hole or wound forms in bladder (102), sealing flaps (110) will move towards a hole in bladder (102) to at least partially reduce the flow of bladder liquid through the unwanted hole. When a hole is formed in a bladder, the dynamic movement of liquid in the bladder towards and through the hole can urge flaps (110) towards the hole. Once the flaps are positioned over and/or within the hole, the differential pressure across the hole holds the flaps in a hole sealing position.

Since bladder holes can be small, only a small flow rate liquid may be available to urge sealing flaps (110) towards the unwanted bladder hole and into a sealing position. Therefore, sealing flaps (110) may include one or more features that allow them to move in response to small liquid flow rates. One such feature is making flaps (110) essentially neutrally buoyant to the bladder liquid. The term "neutrally buoyant" is used to refer to a flap material density that differs from the density of the fluid in the bladder by no more than 10%, more preferably by no more than 5% and ideally by no more than 1%. Sealing flaps can be made neutrally buoyant by matching the density of the flap material with the bladder liquid density. Sealing flaps can alternatively be made neutrally buoyant by incorporating sealed voids in the flap material or by adding pieces or strips of bladder liquid buoyant material to the sealing flaps to cause the combined material sealing flaps to be neutrally buoyant.

Another feature that can promote sealing flap movement in response to the flow of fluid in the bladder towards a bladder hole is one or more sealing flap hinges. Sealing flaps (110) including a variety of different hinge designs are shown in FIGS. 9A-9D. FIG. 9A shows a sealing flap (110) that includes a narrowed point of attachment (140) near to the point where sealing flap (110) is associated with bladder (102). The narrowed point of attachment acts as a hinge that promotes the bending of sealing flap (110). The sealing flap (110) shown in FIG. 9A is integral to and part of bladder (102).

FIG. 9B shows a sealing flap (110) that was formed separately from bladder (102) and that was subsequently attached to bladder inner surface (111) at attachment point (138). Flap (110) includes a narrowed hinge (140).

FIG. 9C is a front view of a sealing flap (110) including a hinge in the form of openings or gaps in the sealing flap the in vicinity of hinge (140). The gaps include, for example, a rectangular slot (142) and a plurality of circular holes (144) where sealing flap (110) includes either no material or a thinned material portion. Any types of holes or perforations can be applied to a flap to form a hinged section at which section the amount of flap material in the hinged section is less than the amount of flap material in a non-hinged flap section.

FIG. 9D is a sealing flap having undulating edges (145) that cause sealing flap (110) to have varying widths including a plurality of narrowed width portions (146) where each narrowed width portion (146) forms a hinge. It should be noted that each sealing flap (110) may include one or more than one hinge.

The sealing flaps (110) may be made from a material that is tacky or they may be surface treated with a tacky material. The tacky material may facilitate the partial sealing or substantial sealing of a bladder wound or hole by providing a second mechanism (other than pressure differential) for retaining one or more sealing flaps in a covering relationship with a hole or wound. Alternatively, the "tacky material" can be a material that is not tacky but instead it is a material that forms when the flap contacts a reactive bladder material and the flap surface includes a material that reacts with the reactive bladder material to form a tacky layer or bond. The reactive bladder material can be, for example, the material of bladder inner surface (111) or a material from a bladder layer that is exposed to the flap when a hole forms in the bladder. The formation of this bond may require contact between the flap and inner surface for a certain amount of time, and/or may require a certain amount of pressure to form the bond. An example of the operation of sealing flaps (110) is explained with reference to FIGS. 10A-10C. A cutaway view of an intact bladder (102) including a plurality of parallel oriented sealing flaps (110) is shown in FIG. 10A. In FIG. 10B an unwanted hole (160) forms in bladder (102). Hole (160) can be formed in any manner such as by perforation of the bladder with a projectile, shrapnel, rock, debris and so forth. Once hole (160) is formed in bladder (102), bladder liquid begins leaking from the unwanted hole. The flow of bladder fluid towards hole (160) urges one or more sealing flaps (110) towards hole (160) to at least partially reducing the unwanted liquid flow. In FIG. 10O, adjacent sealing flaps (155) and (155') have moved towards the unwanted hole and overlap one another sufficiently to form plug (162) in which sealing flaps (155) and/or (155') at least abut hole (160) and which possibly extend partially or substantially into hole (160). Sealing flaps (110) can be spaced apart on bladder inner surface (111) in an arrangement that allows adjacent sealing flaps (110) to either overlap each other such as is shown in FIG. 11A or to abut each other as is shown in FIG. 11B when required to seal an unwanted hole.

It is possible that the sealing flaps can be used to seal bladder holes greater than 0 inches and up to 3 inches across or up to 5 inches across or even larger. The maximum size of the expected unwanted hole that might be necessary to seal can, to some extent, dictate sealing flap dimensions and spacing. In general, each sealing flap should have a height dimension "Y", shown in FIG. 4, of at least one half of the average width of the largest hole that the flaps are designed to seal. In this regard, sealing flaps (110) can have at least one dimension (average length or width) of from about 1 inch to about 10 inches or more or alternatively, at least one dimension of from about 1.5 inches to about 6 inches.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A self-sealing bladder comprising:
a liquid bladder defining a volume and holding a liquid, the liquid bladder having a liquid impermeable material layer that is compatible with a liquid held in the bladder, the liquid impermeable material layer having an inner surface and an outer surface; and
a plurality of sealing flaps
    (i) extending inwardly from the inner surface, and
    (ii) having a first substantially planar surface and a second substantially planar surface opposite the first surface, wherein the second planar surface is separated from the first planar surface by an edge,
wherein, in response to a hole formed in the bladder wall that establishes an unwanted flow of liquid out of the bladder, at least one sealing flap responds to the unwanted liquid flow by bending towards and at least partially sealing the hole, wherein the sealing flaps are neutrally buoyant in the liquid held in the bladder.

2. The self-sealing bladder of claim 1 wherein at least one of the sealing flaps has a common rib and at least one end that is attached to the inner surface.

3. The self-sealing bladder of claim 1 wherein the plurality of sealing flaps are arranged in a plurality of rows.

4. The self-sealing bladder of claim 3 wherein at least one sealing flap row includes two or more segmented sealing flaps.

5. The self-sealing bladder of claim 4 wherein the two or more segmented sealing flaps are offset from one another by a gap.

6. The self-sealing bladder of claim 3 wherein two or more of the plurality of rows of sealing flaps are oriented essentially parallel to one another.

7. The self-sealing bladder of claim 3 wherein at least one first sealing flap row is perpendicular to an at least one second sealing flap row.

8. The self-sealing bladder of claim 3 wherein two or more of the plurality of sealing flaps rows respond to the unwanted flow of liquid by bending towards and substantially covering the hole with a first of the two or more sealing flaps being capable of overlapping a second of the two or more sealing flaps.

9. The self-sealing bladder of claim 1 wherein at least one of the sealing flaps includes a reinforcement.

10. The self-sealing bladder of claim 9 wherein the reinforcement includes one or more ribs.

11. The self-sealing bladder of claim 9 wherein the reinforcement includes unwoven or woven fibers.

12. The self-sealing bladder of claim 1 where one or more of the plurality of sealing flaps are corrugated.

13. The self-sealing bladder of claim 1 wherein the sealing flaps have a width of from about 1 inch to about 10 inches or more.

14. The self-sealing bladder of claim 1 wherein the sealing flaps are flexible.

15. The self-sealing liquid bladder of claim 1 wherein the bladder holds a hydrocarbon liquid.

16. The self-sealing bladder of claim 1 wherein the bladder hole has a diameter of from greater than 0 inches to about 3 inches.

17. A self-sealing bladder comprising:
a liquid bladder defining a volume capable of holding a fluid and having a liquid impermeable material layer that is compatible with a liquid held in the bladder, the liquid impermeable material layer having an inner surface and an outer surface; and
a plurality of sealing flaps extending inwardly from the inner surface wherein, in response to a hole formed in the bladder wall that establishes an unwanted flow of liquid out of the bladder, at least one sealing flap responds to the unwanted liquid flow by bending towards and at least partially sealing the hole, wherein one or more of the plurality of sealing flaps includes a hinge wherein the hinge is portion of the sealing flap that is essentially parallel to the interior surface to which the flap is attached that has a thickness that is less than the average thickness of the flap.

18. The self-sealing bladder of claim 17 wherein the hinge is a portion of the sealing flap that is essentially parallel to the interior surface to which the sealing flap is attached that includes a plurality of circular holes that pass partially or completely through the sealing flap.

19. The self-sealing bladder of claim 17 wherein the hinge has at least one narrowed point of attachment of the sealing flap to the inner surface.

20. A self-sealing bladder comprising:
a liquid bladder defining a volume capable of holding a hydrocarbon fuel and having a liquid impermeable material layer that is compatible with the hydrocarbon fuel, the liquid impermeable material layer having an inner surface and an outer surface; and
a plurality of substantially parallel sealing flaps
    (i) extending inwardly from the inner surface, each flap having a width of from about 1.5 inches to about 6 inches, and
    (ii) having a first substantially planar surface and a second substantially planar surface opposite the first surface, wherein the second planar surface is separated from the first planar surface by an edge,
wherein, in response to a hole formed in the bladder liquid impermeable material layer that establishes an unwanted flow of hydrocarbon fuel from the bladder, at least one flexible sealing flap responds to the unwanted flow of hydrocarbon fuel by moving towards and substantially sealing the hole wherein the hole has a diameter of from greater than 0 to about 3 inches wherein one or more of the plurality of sealing flaps include a tacky material.

21. The self-sealing bladder of claim 20 wherein the tacky material is formed when a flap contacts a reactive bladder material.

* * * * *